(12) United States Patent
Okuhata et al.

(10) Patent No.: US 11,489,399 B2
(45) Date of Patent: Nov. 1, 2022

(54) MOTOR

(71) Applicant: NIDEC CORPORATION, Kyoto (JP)

(72) Inventors: Yoshihisa Okuhata, Kanagawa (JP); Kunihiro Kajita, Kanagawa (JP); Mika Konagaya, Kanagawa (JP); Yosuke Ito, Kanagawa (JP)

(73) Assignee: NIDEC CORPORATION, Kyoto (JP)

( * ) Notice: Subject to any disclaimer, the term of this patent is extended or adjusted under 35 U.S.C. 154(b) by 115 days.

(21) Appl. No.: 16/631,439

(22) PCT Filed: Jul. 25, 2018

(86) PCT No.: PCT/JP2018/027813
§ 371 (c)(1),
(2) Date: Jan. 15, 2020

(87) PCT Pub. No.: WO2019/022109
PCT Pub. Date: Jan. 31, 2019

(65) Prior Publication Data
US 2020/0212755 A1      Jul. 2, 2020

(30) Foreign Application Priority Data

Jul. 28, 2017  (JP) .............................. JP2017-147109

(51) Int. Cl.
*H02K 5/20*   (2006.01)
*H02K 9/00*   (2006.01)
(Continued)

(52) U.S. Cl.
CPC .............. *H02K 5/203* (2021.01); *H02K 5/20* (2013.01); *H02K 9/00* (2013.01); *H02K 9/197* (2013.01);
(Continued)

(58) Field of Classification Search
CPC ...... H02K 5/20; H02K 11/33; H02K 11/0094; H02K 9/19; H02K 11/225; H02K 7/083;
(Continued)

(56) References Cited

U.S. PATENT DOCUMENTS 6,909,210 B1    6/2005   Bostwick
9,837,876 B2   12/2017   Ishimaru et al.
(Continued)

FOREIGN PATENT DOCUMENTS

CN       204013001 U    12/2014
JP       2015-104257 A   6/2015
(Continued)

*Primary Examiner* — Alexander A Singh
(74) *Attorney, Agent, or Firm* — Hauptman Ham, LLP

(57) ABSTRACT

In one aspect of a motor of the present invention, an inverter housing portion is located on the radially outer side of a stator housing portion. A housing has a tubular circumferential wall surrounding the rotor and the stator on the radially outer side of the rotor and the stator, and is a single member. The circumferential wall has a first cooling flow path, and a partition wall that partitions the stator housing portion and the inverter housing portion. The first cooling flow path extends in the circumferential direction, and at least a part of the first cooling flow path is provided in the partition wall. As viewed along the predetermined direction, a portion of the first cooling flow path provided in the partition wall has a portion overlapping the inverter and a portion overlapping the capacitor.

13 Claims, 7 Drawing Sheets

(51) Int. Cl.
*H02K 9/197* (2006.01)
*H02K 11/33* (2016.01)
*H02K 11/00* (2016.01)

(52) U.S. Cl.
CPC .......... *H02K 11/0094* (2013.01); *H02K 11/33* (2016.01)

(58) Field of Classification Search
CPC ...... H02K 2211/03; H02K 5/15; H02K 9/193; H02K 9/00; H02K 9/08; H02K 9/10; H02K 9/12; H02K 9/14; H02K 9/16; H02K 9/18; H02K 9/197; H02K 9/20; H02K 9/22; H02K 9/223; H02K 9/225; H02K 9/227; H02K 5/12; H02K 5/203; H02K 2209/00
USPC ..... 310/89, 52, 53, 54, 55, 57, 58, 59, 60 R, 310/60 A
See application file for complete search history.

(56) References Cited

U.S. PATENT DOCUMENTS

| | | | |
|---|---|---|---|
| 2012/0267969 A1* | 10/2012 | Iwamoto | H02K 5/20 310/54 |
| 2013/0241458 A1* | 9/2013 | Soma | H02K 11/33 318/495 |
| 2016/0105084 A1* | 4/2016 | Ishimaru | H02K 11/215 310/54 |
| 2016/0126808 A1* | 5/2016 | Nagao | H02K 3/28 310/54 |
| 2016/0233737 A1* | 8/2016 | Nakamura | H02K 5/225 |
| 2016/0248302 A1* | 8/2016 | Nagao | H02K 5/225 |
| 2018/0026493 A1* | 1/2018 | Jung | H02K 5/20 310/52 |

FOREIGN PATENT DOCUMENTS

| | | |
|---|---|---|
| JP | 2016-220391 A | 12/2016 |
| WO | 2013/069321 A1 | 5/2013 |

* cited by examiner

MOTOR

CROSS-REFERENCE TO RELATED APPLICATIONS

This is the U.S. national stage of application No. PCT/JP2018/027813, filed on Jul. 25, 2018 and priority under 35 U.S.C. § 119(a) and 35 U.S.C. § 365(b) is claimed from Japanese Application No. 2017-147109, filed on Jul. 28, 2017.

FIELD OF THE INVENTION

The present invention relates to a motor.

BACKGROUND

There is known a motor in which a rotor, a stator, and an inverter device are housed in a housing and integrated. For example, a configuration in which a rotor, a stator, and an inverter device are arranged on a central axis inside a housing is known.

In the motor as described above, it is required that the stator and the inverter device can be efficiently cooled. In particular, when the inverter device includes an inverter and a capacitor, it is required that the stator, the inverter, and the capacitor can be efficiently cooled. As a method for cooling the stator, the inverter, and the capacitor, it is conceivable to provide the housing with a cooling flow path through which a coolant flows. However, there is a case where the cooling efficiency of the stator, the inverter, and the capacitor are not sufficiently obtained simply by providing the cooling flow path in the housing.

SUMMARY

One aspect of a motor of the present invention includes: a rotor having a motor shaft arranged along a central axis that extends in one direction; a stator opposing the rotor with a gap in a radial direction; an inverter electrically connected to the stator; a capacitor electrically connected to the inverter; and a housing having a stator housing portion that houses the stator and an inverter housing portion that houses the inverter and the capacitor. The inverter housing portion is located on a radially outer side of the stator housing portion and is located on one side of the stator housing portion in a predetermined direction orthogonal to the axial direction. The housing has a tubular circumferential wall surrounding the rotor and the stator on a radially outer side of the rotor and the stator and is a single member. The circumferential wall has: a first cooling flow path; and a partition wall that partitions the stator housing portion and the inverter housing portion. The first cooling flow path extends in a circumferential direction, and at least a part of the first cooling flow path is provided in the partition wall. A portion of the first cooling flow path provided in the partition wall has a portion overlapping the inverter and a portion overlapping the capacitor as viewed along the predetermined direction.

The above and other elements, features, steps, characteristics and advantages of the present disclosure will become more apparent from the following detailed description of the preferred embodiments with reference to the attached drawings.

DETAILED DESCRIPTION

Figure 1:
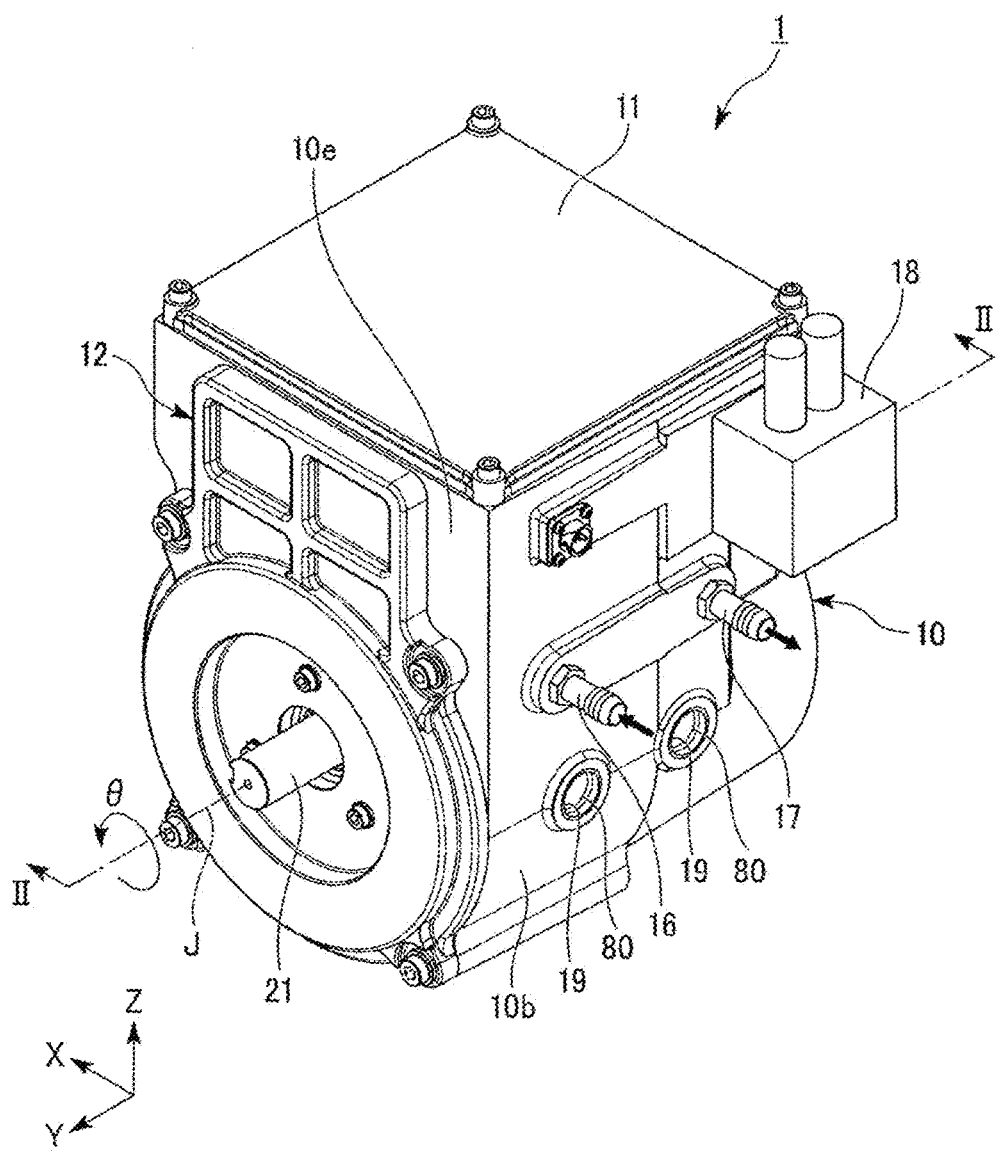
FIG. 1 is a perspective view illustrating a motor according to the present invention.

A Z-axis direction illustrated in each drawing is a vertical direction Z in which a positive side is an upper side and a negative side is a lower side. A Y-axis direction is a direction parallel to a central axis J extending in one direction illustrated in each drawing and is a direction orthogonal to the vertical direction Z. In the following description, the direction parallel to the central axis J, that is, the Y-axis direction will be simply referred to as an "axial direction Y". In addition, a positive side in the axial direction Y will be referred to as "one side in the axial direction", and a negative side in the axial direction Y will be referred to as the "other side in the axial direction". The X-axis direction illustrated in each drawing is a direction orthogonal to both the axial direction Y and the vertical direction Z. In the following description, the X-axis direction will be referred to as a "width direction X". In addition, a positive side in the width direction X will be referred to as "one side in the width direction", and a negative side in the width direction X will be referred to as the "other side in the width direction". In the present embodiment, the vertical direction Z corresponds to a predetermined direction.

In addition, a radial direction about the central axis J will be simply referred to as the "radial direction", and a circumferential direction about the central axis J will be simply referred to as a "circumferential direction θ". In addition, in the circumferential direction θ, a side proceeding clockwise, that is, the side on which an arrow indicating the circumferential direction θ in the drawing proceeds will be referred to as "one side in the circumferential direction", and a side proceeding counterclockwise, that is, the side opposite to the side on which the arrow indicating the circumferential direction θ in the drawing proceeds will be referred to as "the other side in the circumferential direction" as viewed from the other side in the axial direction toward the one side in the axial direction.

Note that the vertical direction, the upper side, and the lower side are simply names for describing a relative positional relationship of each portion, and an actual arrangement relationship or the like may be an arrangement relationship other than the arrangement relationship indicated by these names.

Figure 2:
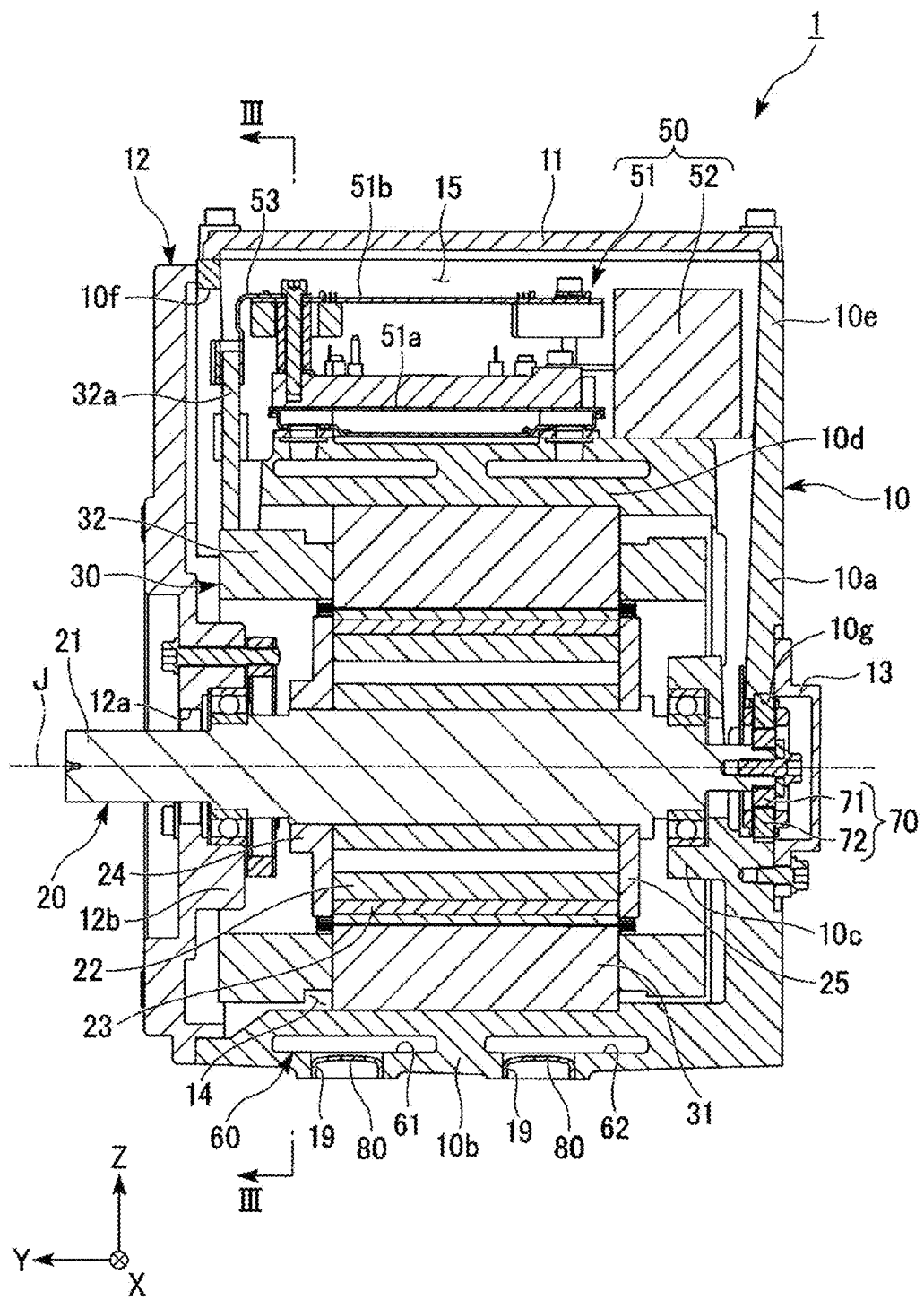
FIG. 2 is a view illustrating the motor according to the present embodiment and is a cross-sectional view taken along line II-II of FIG. 1.

As illustrated in FIGS. 1 and 2, a motor 1 of the present embodiment includes a housing 10, a lid 11, a cover member 12, a sensor cover 13, a rotor 20 having a motor shaft 21 arranged along the central axis J, a stator 30, an inverter unit 50, a connector 18, and a rotation detection unit 70.

As illustrated in FIG. 2, the housing 10 houses the rotor 20, the stator 30, the rotation detection unit 70, and the inverter unit 50. The housing 10 is a single member. The housing 10 is manufactured by sand casting, for example. The housing 10 includes a circumferential wall 10b, a bottom wall 10a, a bearing holding portion 10c, and a rectangular tube portion 10e.

The circumferential wall 10b has a tubular shape surrounding the rotor 20 and the stator 30 on the radially outer side of the rotor 20 and the stator 30. In the present embodiment, the circumferential wall 10b has a substantially cylindrical shape centered on the central axis J. The circumferential wall 10b is open on the one side in the axial direction. The circumferential wall 10b has a cooling unit 60 that cools the stator 30 and the inverter unit 50.

The bottom wall 10a is provided at an end on the other side in the axial direction of the circumferential wall 10b. The bottom wall 10a closes the other side in the axial direction of the circumferential wall 10b. The bottom wall 10a has a sensor housing portion 10g that penetrates the bottom wall 10a in the axial direction Y. The sensor housing portion 10g has a circular shape centered on the central axis J, for example, as viewed along the axial direction Y. The bottom wall 10a and the circumferential wall 10b constitute a stator housing portion 14. That is, the housing 10 has the bottomed tubular stator housing portion 14 having the circumferential wall 10b and the bottom wall 10a.

The bearing holding portion 10c has a cylindrical shape protruding from a circumferential edge of the sensor housing portion 10g on a surface on the one side in the axial direction of the bottom wall 10a to the one side in the axial direction. The bearing holding portion 10c holds a bearing that supports the motor shaft 21 on the other side in the axial direction of a rotor core 22 to be described later.

As illustrated in FIGS. 1 to 4, the rectangular tube portion 10e has a rectangular tube shape extending upward from the circumferential wall 10b. The rectangular tube portion 10e is open upward. In the present embodiment, the rectangular tube portion 10e has, for example, a square tube shape. As illustrated in FIG. 2, a wall on the other side in the axial direction among walls constituting the rectangular tube portion 10e is connected to an upper end of the bottom wall 10a. The rectangular tube portion 10e has a through-hole 10f that penetrates a wall on the one side in the axial direction among the walls constituting the rectangular tube portion 10e in the axial direction Y. A lower end of the through-hole 10f is connected to an opening on the one side in the axial direction of the circumferential wall 10b. The rectangular tube portion 10e and the circumferential wall 10b constitute an inverter housing portion 15. That is, the housing 10 has the inverter housing portion 15.

The inverter housing portion 15 is located on the radially outer side of the stator housing portion 14. In the present embodiment, the inverter housing portion 15 is located above the stator housing portion 14 in the vertical direction Z orthogonal to the axial direction Y. The stator housing portion 14 and the inverter housing portion 15 are partitioned in the vertical direction Z by a partition wall 10d. The partition wall 10d is an upper portion of the circumferential wall 10b. That is, the circumferential wall 10b includes the partition wall 10d that partitions the stator housing portion 14 and the inverter housing portion 15.

Figure 3:
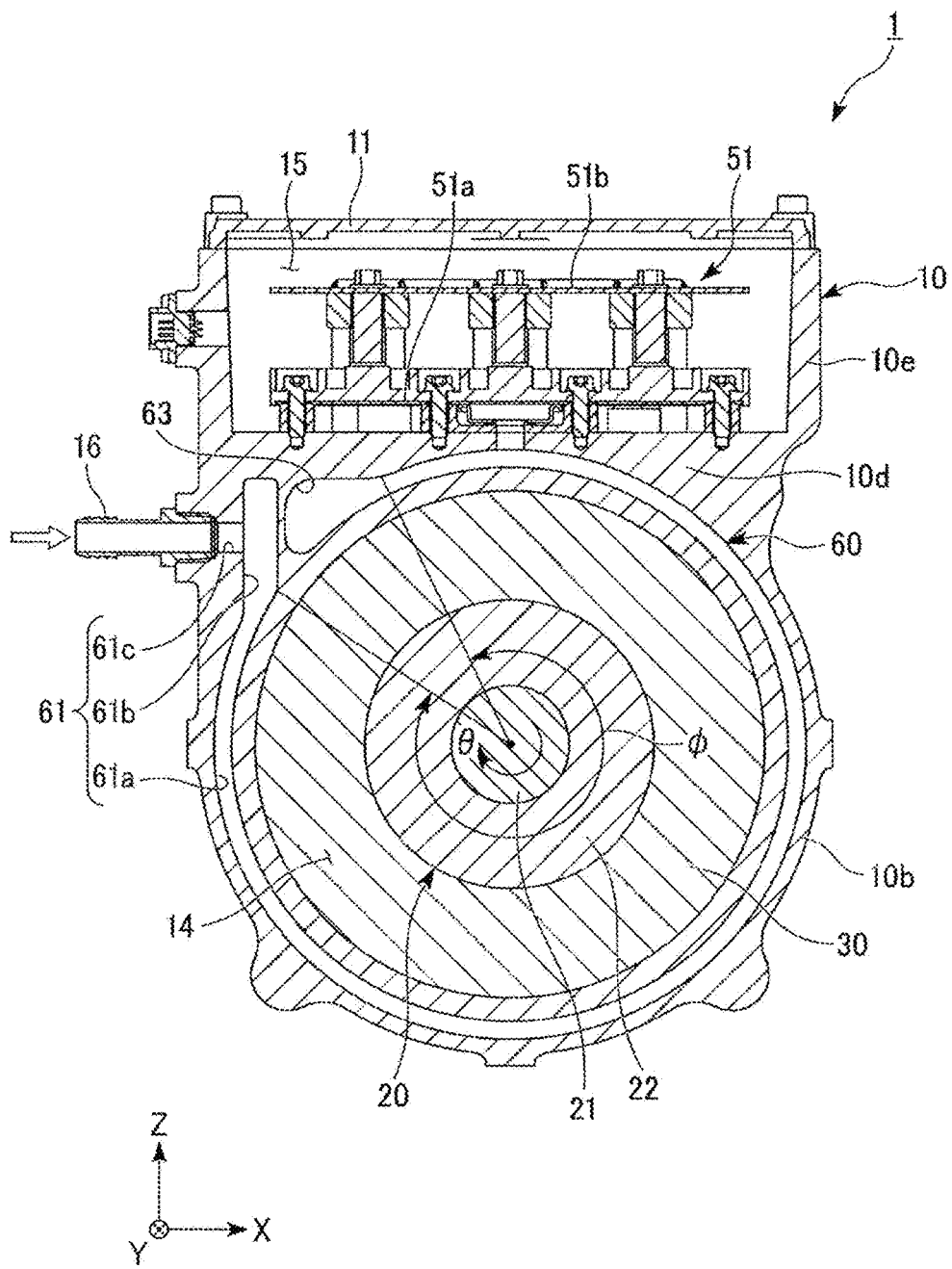
FIG. 3 is a view illustrating the motor according to the present embodiment and is a cross-sectional view taken along line III-III of FIG. 2.

As illustrated in FIG. 3, a dimension of the partition wall 10d in the vertical direction Z increases as a distance from the central axis J increases in the width direction X orthogonal to both the axial direction Y and the vertical direction Z. That is, the dimension of the partition wall 10d in the vertical direction Z is the smallest at a center portion where a position in the width direction X is the same as the central axis J, and increases as being separated from the center portion toward both sides in the width direction X.

The lid 11 illustrated in FIG. 2 has a plate shape whose plate surface is orthogonal to the vertical direction Z. The lid 11 is fixed to an upper end of the rectangular tube portion 10e. The lid 11 closes an upper opening of the rectangular tube portion 10e. Note that FIG. 4 does not illustrate the lid 11. As illustrated in FIGS. 1 and 2, the cover member 12 has a plate shape whose plate surface is orthogonal to the axial direction Y. The cover member 12 is fixed to surfaces on the one side in the axial direction of the circumferential wall 10b and the rectangular tube portion 10e. The cover member 12 closes an opening on the one side in the axial direction of the circumferential wall 10b and the through-hole 10f.

As illustrated in FIG. 2, the cover member 12 has an output shaft hole 12a that penetrates the cover member 12 in the axial direction Y. The output shaft hole 12a has, for example, a circular shape that passes through the central axis J. The cover member 12 includes a bearing holding portion 12b that protrudes from a circumferential edge of the output shaft hole 12a on a surface on the other side in the axial direction of the cover member 12 to the other side in the axial direction. The bearing holding portion 12b holds a bearing that supports the motor shaft 21 on the one side in the axial direction of the rotor core 22 to be described later.

The sensor cover 13 is fixed to a surface on the other side in the axial direction of the bottom wall 10a. The sensor cover 13 covers and closes an opening on the other side in the axial direction of the sensor housing portion 10g. The sensor cover 13 covers the rotation detection unit 70 from the other side in the axial direction.

The rotor 20 includes the motor shaft 21, includes rotor core 22, a magnet 23, a first end plate 24, and a second end plate 25. The motor shaft 21 is rotatably supported by the bearings on both sides in the axial direction. An end on the one side in the axial direction of the motor shaft 21 protrudes from the opening on the one side in the axial direction of the circumferential wall 10b toward the one side in the axial direction. The end on the one side in the axial direction of the motor shaft 21 passes through the output shaft hole 12a and protrudes to the one side in the axial direction from the cover member 12. An end on the other side in the axial direction of the motor shaft 21 is inserted into the sensor housing portion 10g.

The rotor core 22 is fixed to an outer circumferential surface of the motor shaft 21. The magnet 23 is inserted into a hole that penetrates the rotor core 22 provided in the rotor core 22 in the axial direction Y. The first end plate 24 and the second end plate 25 have an annular plate shape that expands in the radial direction. The first end plate 24 and the second end plate 25 sandwich the rotor core 22 in the axial direction Y in the state of being in contact with the rotor core 22. The first end plate 24 and the second end plate 25 press the magnet 23, which has been inserted into the hole of the rotor core 22, from both sides in the axial direction.

The stator 30 opposes the rotor 20 with a gap in the radial direction. The stator 30 includes a stator core 31 and a plurality of coils 32 attached to the stator core 31. The stator core 31 has an annular shape centered on the central axis J. An outer circumferential surface of the stator core 31 is fixed to an inner circumferential surface of the circumferential wall 10b. The stator core 31 opposes the outer side in the radial direction of the rotor core 22 with a gap.

The inverter unit 50 controls power to be supplied to the stator 30. The inverter unit 50 includes an inverter 51 and a capacitor 52. That is, the motor 1 includes an inverter 51 and a capacitor 52. The inverter 51 is housed in the inverter housing portion 15. The inverter 51 includes a first circuit board 51a and a second circuit board 51b. The first circuit board 51a and the second circuit board 51b have a plate shape whose plate surface is orthogonal to the vertical direction Z. The second circuit board 51b is arranged to be separated from the first circuit board 51a. The first circuit board 51a and the second circuit board 51b are electrically connected. A coil wire 32a is connected to the first circuit board 51a via a connector terminal 53. As a result, the inverter 51 is electrically connected to the stator 30.

Figure 4:
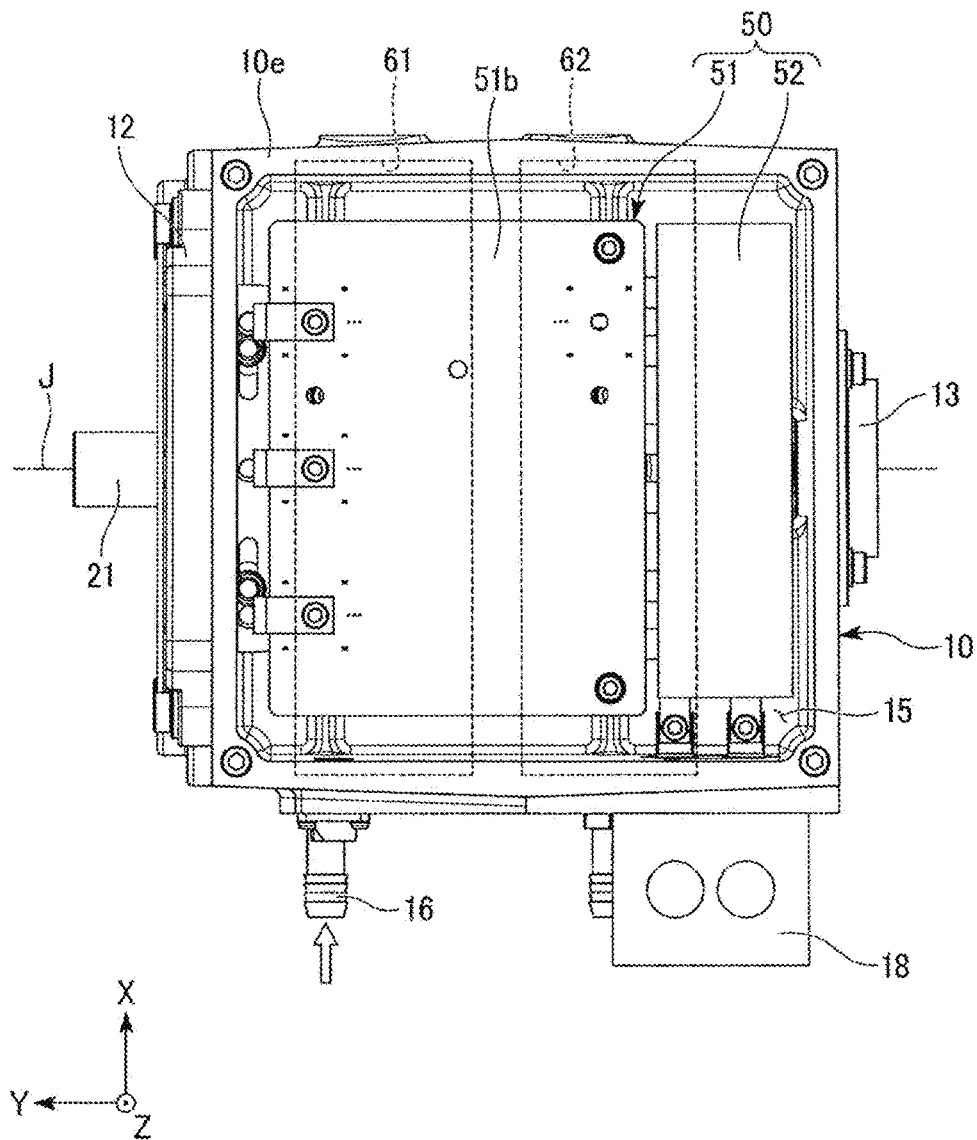
FIG. 4 is a view of the motor according to the present embodiment as viewed from above.

As illustrated in FIGS. 2 and 4, the capacitor 52 has a rectangular parallelepiped shape that is long in the width direction X. The capacitor 52 is housed in the inverter housing portion 15. The capacitor 52 is arranged on the other side in the axial direction of the inverter 51. That is, the inverter 51 and the capacitor 52 are arranged side by side in the axial direction Y in the inverter housing portion 15. The capacitor 52 is electrically connected to the inverter 51. As illustrated in FIG. 2, the capacitor 52 is fixed to an upper surface of the partition wall 10d. The capacitor 52 is in contact with the partition wall 10d.

As illustrated in FIG. 1, the connector 18 is provided on a surface on the other side in the width direction of the rectangular tube portion 10e. An external power supply (not illustrated) is connected to the connector 18. Power is supplied to the inverter unit 50 from the external power supply connected to the connector 18.

The rotation detection unit 70 detects the rotation of the rotor 20. In the present embodiment, the rotation detection unit 70 is, for example, a variable reluctance (VR) resolver. As illustrated in FIG. 2, the rotation detection unit 70 is housed in the sensor housing portion 10g. That is, the rotation detection unit 70 is arranged on the bottom wall 10a. The rotation detection unit 70 includes a detected portion 71 and a sensor unit 72.

The detected portion 71 has an annular shape extending in the circumferential direction θ. The detected portion 71 is fitted and fixed to the motor shaft 21. The detected portion 71 is made of a magnetic material. The sensor unit 72 has an annular shape that surrounds the radially outer side of the detected portion 71. The sensor part 72 is fitted into the sensor housing portion 10g. The sensor unit 72 is supported by the sensor cover 13 from the other side in the axial direction. That is, the sensor cover 13 supports the rotation detection unit 70 from the other side in the axial direction. The sensor unit 72 has a plurality of coils along the circumferential direction θ.

Although not illustrated, the motor 1 further includes a sensor wiring that electrically connects the rotation detection unit 70 and the inverter 51. One end of the sensor wiring is connected to the detected portion 71. The sensor wiring is routed from the detected portion 71 to the inside of the inverter housing portion 15 through a through-hole that penetrates the inside of the bottom wall 10a and the partition wall 10d in the radial direction. The other end of the sensor wiring is connected to, for example, the first circuit board 51a.

When the detected portion 71 rotates together with the motor shaft 21, an induced voltage corresponding to a circumferential position of the detected portion 71 is generated in the coil of the sensor unit 72. The sensor unit 72 detects the rotation of the detected portion 71 by detecting the induced voltage. As a result, the rotation detection unit 70 detects the rotation of the rotor 20 by detecting the rotation of the motor shaft 21. The rotation information of the rotor 20 detected by the rotation detection unit 70 is sent to the inverter 51 via the sensor wiring.

Figure 5:
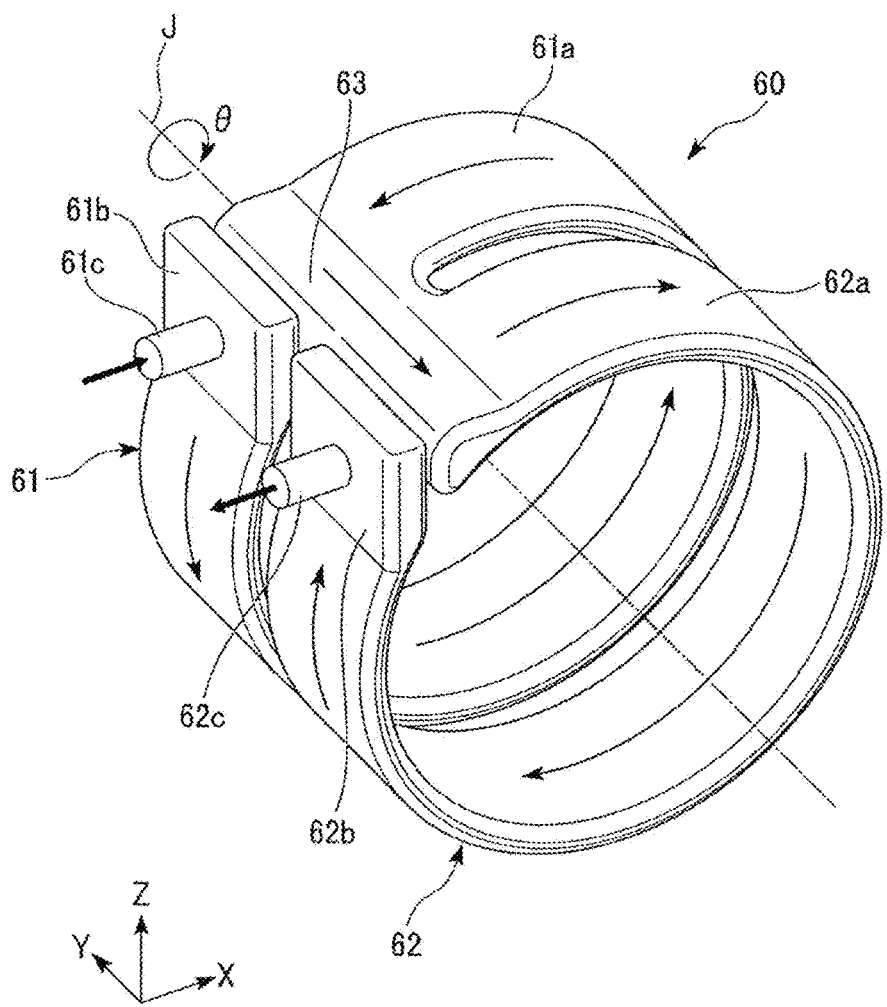
FIG. 5 is a perspective view illustrating a cooling unit according to the present embodiment.

As illustrated in FIG. 5, the cooling unit 60 includes an upstream cooling flow path 61 and a downstream cooling flow path 62 as a plurality of cooling flow paths, and a connection flow path portion 63. That is, the circumferential wall 10b includes the upstream cooling flow path 61 and the downstream cooling flow path 62 as the plurality of cooling flow paths, and the connection flow path portion 63. In the present embodiment, the upstream cooling flow path 61 corresponds to a second cooling flow path. The downstream cooling flow path 62 corresponds to a first cooling flow path. Note that an internal space of the cooling unit 60 is illustrated as a three-dimensional shape in FIG. 5.

The plurality of cooling flow paths, that is, the upstream cooling flow path 61 and the downstream cooling flow path 62 in the present embodiment are arranged in the axial direction Y. The upstream cooling flow path 61 and the downstream cooling flow path 62 are two cooling flow paths adjacent to each other in the axial direction Y. In the present embodiment, the upstream cooling flow path 61 is one cooling flow path located on the one side in the axial direction between the two cooling flow paths adjacent to each other in the axial direction Y. The downstream cooling flow path 62 is the other cooling flow path located on the other side in the axial direction between the two cooling flow paths adjacent to each other in the axial direction Y.

The coolant flows through the upstream cooling flow path 61 and the downstream cooling flow path 62. The coolant is not particularly limited as long as being a fluid that can cool the stator 30 and the inverter 51. The coolant may be water, a liquid other than water, or a gas.

The upstream cooling flow path 61 extends in the circumferential direction θ. The upstream cooling flow path 61 includes an upstream flow path body 61a, an inflow portion 61b, and an inlet 61c. The upstream flow path body 61a has an arc shape that is wide in the axial direction Y and extends in the circumferential direction θ. As illustrated in FIG. 3, the upstream flow path body 61a extends from a portion on the other side in the width direction of the circumferential wall 10b to the other side in the circumferential direction through a lower end of the circumferential wall 10b and extends up to an upper end of the circumferential wall 10b. A central angle φ of the upstream flow path body 61a is larger than 180°. As a result, the upstream cooling flow path 61 has an arc shape having the central angle larger than 180°.

The inflow portion 61b is connected to the upstream flow path body 61a. More specifically, the inflow portion 61b is connected to an end on one side in the circumferential direction of the upstream flow path body 61a. The inflow portion 61b extends upward from the end on the one side in the circumferential direction of the upstream flow path body 61a. As illustrated in FIG. 5, a dimension of the inflow portion 61b in the axial direction Y is the same as a dimension of the upstream flow path body 61a in the axial direction Y. A dimension of the inflow portion 61b in the width direction X is larger than a radial dimension of the upstream flow path body 61a. As illustrated in FIG. 3, an upper end of the inflow portion 61b is located below an upper end of the upstream flow path body 61a. The inflow portion 61b is the end on the one side in the circumferential direction of the upstream cooling flow path 61.

The inlet 61c is provided in the inflow portion 61b. That is, the inlet 61c is located at the end on the one side in the circumferential direction of the upstream cooling flow path 61. As illustrated in FIG. 5, the inlet 61c protrudes from a center portion of the inflow portion 61b in the axial direction Y and the vertical direction Z to the other side in the width direction. The coolant flows into the inlet 61c. A cross-sectional shape orthogonal to the width direction X of the inlet 61c is, for example, a circular shape. As illustrated in FIG. 3, an inflow pipe 16 is connected to the inlet 61c. The inflow pipe 16 is inserted into a hole provided in the housing 10. The inflow pipe 16 protrudes from the housing 10 to the other side in the width direction.

At least a part of the upstream cooling flow path 61 is provided in the partition wall 10d. Therefore, the stator housing portion 14 and the inverter housing portion 15 partitioned by the partition wall 10d can be cooled by the coolant flowing through the upstream cooling flow path 61, and the stator 30 housed in the stator housing portion 14 and the inverter 51 housed in the inverter housing portion 15 can be cooled.

In the present embodiment, an upper portion of the upstream flow path body 61a and the inflow portion 61b are provided in the partition wall 10d. As viewed along the vertical direction Z, a portion of the upstream cooling flow path 61 provided in the partition wall 10d has a portion overlapping the inverter 51. As a result, the inverter 51 is more easily cooled by the upstream cooling flow path 61. In the present embodiment, the upper portion of the upstream flow path body 61a overlaps the inverter 51 out of the portion of the upstream cooling flow path 61 provided in the partition wall 10d as viewed along the vertical direction Z.

In the present embodiment, the portion of the upstream cooling flow path 61 provided in the partition wall 10d is a single-layer flow path between the stator housing portion 14 and the inverter 51 in the radial direction. Therefore, it is possible to simplify the configuration of the upstream cooling flow path 61 as compared with a case where a plurality of layers of flow paths are provided side by side in the radial direction. In addition, a radial dimension of the partition wall 10d can be easily reduced, and the motor 1 can be easily downsized.

In the present specification, the expression, "a certain flow path is a single-layer flow path in a certain portion" includes a case where only one continuous flow path is provided in a certain portion. For example, a case where two portions that are discontinuous are provided in a certain portion even if the same flow path is continuous as a whole corresponds to a state where a plurality of layers of flow paths are provided in a certain portion. In the present embodiment, the portion of the upstream cooling flow path 61 provided between the stator housing portion 14 and the inverter 51 in the radial direction is only one continuous portion.

As illustrated in FIG. 4, the maximum dimension of the upstream cooling flow path 61 in the width direction X is larger than a dimension of the second circuit board 51b in the width direction X and a dimension of the capacitor 52 in the width direction X. Although not illustrated, the maximum dimension of the upstream cooling flow path 61 in the width direction X is larger than a dimension of the first circuit board 51a in the width direction X. Therefore, the inverter 51 can be more easily cooled by the upstream cooling flow path 61. The maximum dimension of the upstream cooling flow path 61 in the width direction X is a distance in the width direction X between a portion of the upstream cooling flow path 61 located closest to the one side in the width direction and a portion of the upstream cooling flow path 61 located closest to the other side in the width direction. In the present embodiment, the maximum dimension of the upstream cooling flow path 61 in the width direction X corresponds to an outer diameter of the arc-shaped upstream cooling flow path 61.

As illustrated in FIG. 5, the downstream cooling flow path 62 is arranged on the other side in the axial direction of the upstream cooling flow path 61. A shape of the downstream cooling flow path 62 is the same as the shape of the upstream cooling flow path 61. The downstream cooling flow path 62 has a downstream flow path body 62a, an outflow portion 62b, and an outlet 62c. A shape of the downstream flow path body 62a is the same as the shape of the upstream flow path body 61a.

The outflow portion 62b is connected to the downstream flow path body 62a. More specifically, the outflow portion 62b is connected to an end on one side in the circumferential direction of the downstream flow path body 62a. The outflow portion 62b extends upward from the end on the one side in the circumferential direction of the downstream flow path body 62a. A dimension of the outflow portion 62b in the axial direction Y is the same as a dimension of the downstream flow path body 62a in the axial direction Y. A dimension of the outflow portion 62b in the width direction X is larger than a radial dimension of the downstream flow path body 62a. An upper end of the outflow portion 62b is located below an upper end of the downstream flow path body 62a. A shape of the outflow portion 62b is the same as the shape of the inflow portion 61b. The outflow portion 62b is the end on the one side in the circumferential direction of the downstream cooling flow path 62.

The outlet 62c is provided in the outflow portion 62b. That is, the outlet 62c is located at the end on the one side in the circumferential direction of the downstream cooling flow path 62. The outlet 62c protrudes from a center portion of the outflow portion 62b in the axial direction Y and the vertical direction Z to the other side in the width direction. The coolant flows out of the outlet 62c. A cross-sectional shape orthogonal to the width direction X of the outlet 62c is, for example, a circular shape. A shape of the outlet 62c is the same as the shape of the inlet 61c. The inlet 61c and the outlet 62c are arranged at the same position in the vertical direction Z. The inlet 61c and the outlet 62c are arranged with an interval in the axial direction Y.

An outflow pipe 17 illustrated in FIG. 1 is connected to the outlet 62c. The outflow pipe 17 is inserted into a hole provided in the housing 10. The outflow pipe 17 protrudes from the housing 10 to the other side in the width direction. The inflow pipe 16 and the outflow pipe 17 are arranged at the same position in the vertical direction Z. The inflow pipe 16 and the outflow pipe 17 are arranged with an interval in the axial direction Y.

As illustrated in FIG. 2, at least a part of the downstream cooling flow path 62 is provided in the partition wall 10d. Therefore, the stator housing portion 14 and the inverter housing portion 15 partitioned by the partition wall 10d can be cooled by the coolant flowing through the downstream cooling flow path 62, and the stator 30 housed in the stator housing portion 14 and the inverter 51 housed in the inverter housing portion 15 can be cooled.

In the present embodiment, an upper portion of the downstream flow path body 62a and the outflow portion 62b are provided in the partition wall 10d. As viewed along the vertical direction Z, a portion of the downstream cooling flow path 62 provided in the partition wall 10d has a portion overlapping the inverter 51 and a portion overlapping the capacitor 52. Therefore, the stator 30, the inverter 51, and the capacitor 52 can be cooled by the coolant flowing through the downstream cooling flow path 62. Therefore, the three portions can be simultaneously cooled by the single downstream cooling flow path 62, and the cooling can be performed efficiently while reducing the number of cooling flow paths. Therefore, the motor 1 having a structure capable of improving the cooling efficiency of the stator 30, the inverter 51, and the capacitor 52 by the cooling flow path is obtained according to the present embodiment.

In addition, the capacitor 52 is in contact with the partition wall 10d in the present embodiment as described above. Therefore, the heat of the capacitor 52 is easily released to the coolant in the downstream cooling flow path 62 through the partition wall 10d. Therefore, the capacitor 52 is more easily cooled by the downstream cooling flow path 62.

In the present embodiment, the portion of the downstream cooling flow path 62 provided in the partition wall 10d is a single-layer flow path between the stator housing portion 14 and the inverter 51 in the radial direction, and is a single-layer flow path between the stator housing portion 14 and the capacitor 52 in the radial direction. That is, the portion of the downstream cooling flow path 62 provided between the stator housing portion 14 and the inverter 51 in the radial direction is only one continuous portion. In addition, the portion of the downstream cooling flow path 62 provided between the stator housing portion 14 and the capacitor 52 is only one continuous portion. Therefore, it is possible to simplify the configuration of the downstream cooling flow path 62 as compared with a case where a plurality of layers of flow paths are provided side by side in the radial direction. In addition, a radial dimension of the partition wall 10d can be easily reduced, and the motor 1 can be easily downsized.

As illustrated in FIG. 4, the maximum dimension of the downstream cooling flow path 62 in the width direction X is larger than a dimension of the second circuit board 51b in the width direction X and a dimension of the capacitor 52 in the width direction X. Although not illustrated, the maximum dimension of the downstream cooling flow path 62 in the width direction X is larger than the dimension of the first circuit board 51a in the width direction X. Therefore, the inverter 51 and the capacitor 52 are more easily cooled by the downstream cooling flow path 62. The maximum dimension of the downstream cooling flow path 62 in the width direction X is a distance in the width direction X between a portion of the downstream cooling flow path 62 located on one side in the width direction and a portion of the downstream cooling flow path 62 located on the other side in the width direction. In the present embodiment, the maximum dimension of the downstream cooling flow path 62 in the width direction X corresponds to an outer diameter of the arc-shaped downstream cooling flow path 62. The maximum dimension of the downstream cooling flow path 62 in the width direction X is, for example, the same as the maximum dimension of the upstream cooling flow path 61 in the width direction X.

The dimension of the upstream cooling flow path 61 in the axial direction Y and the dimension of the downstream cooling flow path 62 in the axial direction Y are the same. That is, the dimensions of the plurality of cooling flow paths in the axial direction Y are the same. The radial dimension of the upstream cooling flow path 61 and the radial dimension of the downstream cooling flow path 62 are the same. In other words, the radial dimensions of the plurality of cooling flow paths are the same.

Note that a comparison between the dimension in the axial direction Y and the radial dimension of each cooling flow path includes, for example, a comparison between the flow path bodies. That is, the dimension of the upstream flow path body 61a in the axial direction Y and the dimension of the downstream flow path body 62a in the axial direction Y are the same. The radial dimension of the upstream flow path body 61a and the radial dimension of the downstream flow path body 62a are the same.

Figure 6:
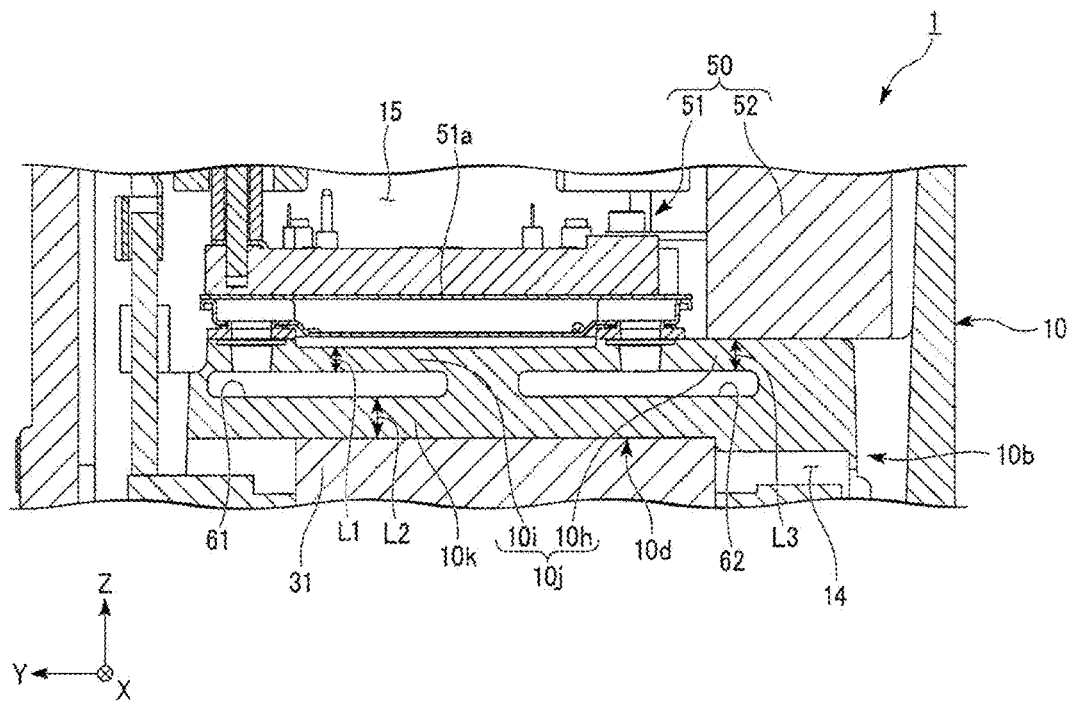
FIG. 6 is a cross-sectional view illustrating a part of the motor according to the present embodiment.

As illustrated in FIG. 6, in a portion 10j of the partition wall 10d located between the cooling flow path and the inverter housing portion 15 in the radial direction, a portion 10i located between the cooling flow path and the inverter 51 in the radial direction has a smaller radial dimension than a portion 10h located between the cooling flow path and the capacitor 52 in the radial direction. That is, a radial dimension L1 of the portion 10i is smaller than a radial dimension L3 of the portion 10h. As a result, the cooling flow path can be brought close to the inverter 51, and the inverter 51 can be cooled more easily.

In the present embodiment, the portion 10i includes a portion of the partition wall 10d located between the upstream cooling flow path 61 and the inverter 51 in the radial direction and a portion of the partition wall 10d located between the downstream cooling flow path 62 and the inverter 51 in the radial direction. The portion 10h includes a portion of the partition wall 10d located between the downstream cooling flow path 62 and the capacitor 52 in the radial direction.

The portion 10j of the partition wall 10d located between the cooling flow path and the inverter housing portion 15 in the radial direction has a smaller radial dimension than a portion 10k of the partition wall 10d located between the cooling flow path and the stator housing portion 14 in the radial direction. That is, the radial dimension L1 of the portion 10i and the radial dimension L3 of the portion 10h are smaller than a radial dimension L2 of the portion 10k. As a result, the cooling flow path can be brought closer to the inverter housing portion 15 than the stator housing portion 14, and the inverter housing portion 15 can be more easily cooled. In addition, the dimension L2 can be relatively easily increased, the radial dimension of the portion of the circumferential wall 10b that is in contact with the stator core 31 can be easily increased. As a result, the strength that holds the stator core 31 in the circumferential wall 10b can be made relatively large. As described above, the dimension L1, the dimension L2, and the dimension L3 satisfy the relationship L1<L3<L2.

Note that the above-described size relationship among the dimension L1, the dimension L2, and the dimension L3 may be established at least among the minimum values of the respective dimensions. For example, the dimension L1 and the dimension L2 vary depending on a position in the circumferential direction θ in the present embodiment, but it is sufficient to satisfy the above-described relationship of L1<L3<L2 when the minimum value of the dimension L1 and the minimum value of the dimension L2 are compared with the dimension L3. In the present embodiment, the size relationship among the dimension L1, the dimension L2, and the dimension L3 satisfies the relationship L1<L3<L2 at a center portion of the partition wall 10d in the width direction X.

As illustrated in FIG. 5, the connection flow path portion 63 connects the cooling flow paths adjacent to each other in the axial direction Y. That is, the connection flow path portion 63 connects the upstream cooling flow path 61 and the downstream cooling flow path 62 in the present embodiment. More specifically, the connection flow path portion 63 connects the end on the other side in the circumferential direction of the upstream cooling flow path 61 and the end on the other side in the circumferential direction of the downstream cooling flow path 62.

As a result, the coolant inside the upstream cooling flow path 61 flows into the downstream cooling flow path 62 via the connection flow path portion 63. More specifically, the coolant, which has flowed into the upstream cooling flow path 61 from the inflow pipe 16 via the inlet 61c, flows into the downstream cooling flow path 62 from the inflow portion 61b via the upstream flow path body 61a and the connection flow path portion 63. That is, the coolant flowing inside the upstream cooling flow path 61 flows from one side in the circumferential direction to the other side in the circumferential direction, and flows into the downstream cooling flow path 62 via the connection flow path portion 63. The coolant flowing inside the connection flow path portion 63 flows from the other side in the axial direction to the one side in the axial direction.

The coolant flowing inside the downstream cooling flow path 62 flows from the other side in the circumferential direction to the one side in the circumferential direction via the downstream flow path body 62a, the outflow portion 62b, and the outlet 62c in this order. In this manner, coolant flow directions in the circumferential direction θ are opposite to each other in the cooling flow paths adjacent to each other in the axial direction Y. The coolant inside the downstream cooling flow path 62 flows out of the housing 10 from the outlet 62c via the outflow pipe 17.

According to the present embodiment, the plurality of cooling flow paths are provided, and thus, the amount of the coolant flowing in the cooling flow paths can be increased. As a result, it is easier to cool the stator 30 and the inverter 51. In addition, the plurality of cooling flow paths are connected by the connection flow path portion 63, and thus, it is possible to cause the coolant to flow through the plurality of cooling flow paths by providing each one of the inlet 61c and the outlet 62c, which is convenient. In addition, the cooling flow paths extending in the circumferential direction θ are connected to be arranged side by side in the axial direction Y, and thus, it is easy to manufacture the respective cooling flow paths and the connection flow path portion 63 as compared with a case where cooling flow paths extending in the axial direction Y are connected to be arranged side by side in the circumferential direction θ, for example.

In addition, since the plurality of cooling flow paths are arranged side by side in the axial direction Y, the dimension in the axial direction Y can be secured as a whole of the plurality of cooling flow paths while reducing the dimension of each cooling flow path in the axial direction Y to reduce a flow path cross-sectional area of each cooling flow path. As a result, a flow rate of the coolant flowing through each cooling flow path can be made relatively large, and the cooling efficiency of the stator 30 and the inverter 51 using the coolant can be improved. In addition, the dimension in the axial direction Y can be secured as a whole of the plurality of cooling flow paths, and thus, a relatively wide range of the stator housing portion 14 and the inverter housing portion 15 can be cooled, and the stator 30 and the inverter 51 can be further cooled.

In addition, the dimension of each cooling flow path in the axial direction Y can be made relatively small, and thus, it is possible to suppress the coolant flow from stagnating in each cooling flow path. As a result, it is possible to suppress a flow rate of the coolant in each cooling flow path from changing depending on the position in the circumferential direction θ, and it is easy to make the degree of cooling obtained by the coolant uniform in circumferential direction θ. Therefore, the cooling efficiency of the stator 30 and the inverter 51 can be further improved.

As described above, the motor 1 having a structure capable of improving the cooling efficiency of the stator 30 and the inverter 51 by the cooling flow path is obtained according to the present embodiment.

In addition, the connection flow path portion 63 connects the end on the other side in the circumferential direction of the upstream cooling flow path 61 and the end on the one side in the circumferential direction of the downstream cooling flow path 62 according to the present embodiment. Therefore, it is possible to suppress generation of a portion in which the coolant stays in the upstream cooling flow path 61 and the downstream cooling flow path 62. As a result, it is possible to further suppress the flow of the coolant from stagnating in each cooling flow path and to further improve the cooling efficiency.

In addition, the two cooling flow paths, that is, the upstream cooling flow path 61 and the downstream cooling flow path 62, are provided, and the inlet 61c and the outlet 62c are located at the end on the one side in the circumferential direction of each cooling flow path according to the present embodiment. That is, the inlet 61c or the outlet 62c is provided at the end on the same side in the circumferential direction θ in each of the upstream cooling flow path 61 and the downstream cooling flow path 62. Therefore, the inflow pipe 16 and the outflow pipe 17 can be provided on the same side surface of the housing 10, and it is easy to connect a pump that circulates the coolant or the like to the motor 1. In addition, since the number of the cooling flow paths is two, it is possible to easily manufacture the plurality of cooling flow paths as compared with a case where the number of cooling flow paths is relatively large.

In addition, according to the present embodiment, the portion of the upstream cooling flow path 61 provided in the partition wall 10d has the portion overlapping the inverter 51, and the portion of the downstream cooling flow path 62 provided in the partition wall 10d has the portion overlapping the capacitor 52 as viewed along the vertical direction Z. Then, the coolant that has flowed from the inlet 61c flows through the upstream cooling flow path 61 prior to the downstream cooling flow path 62. Therefore, the inverter 51 can be cooled by the coolant having a relatively low temperature that has flowed from the inlet 61c. As a result, it is easier to cool the inverter 51. Since the inverter 51 is particularly likely to generate large heat, the motor 1 can be more suitably cooled by making the cooling of the inverter 51 easy.

In addition, each cooling flow path has an arc shape having the central angle φ larger than 180° according to the present embodiment. Therefore, the stator 30 can be easily surrounded by the cooling flow path, and the stator 30 can be further cooled.

In addition, the dimensions of the plurality of cooling flow paths in the axial direction Y are the same according to the present embodiment. Therefore, it is easy to manufacture the plurality of cooling flow paths. In addition, it is easy to make the flow path cross-sectional area of each cooling flow path the same. As a result, it is easy to make the flow rate of the coolant the same in each cooling flow path, and it is easy to make the degree of cooling obtained by each cooling flow path uniform. In the present embodiment, the dimension of the upstream cooling flow path 61 in the axial direction Y and the dimension of the downstream cooling flow path 62 in the axial direction Y are the same. Therefore, it is easy to manufacture the upstream cooling flow path 61 and the downstream cooling flow path 62, and it is easy to make the degree of cooling obtained by the upstream cooling flow path 61 and the degree of cooling obtained by the downstream cooling flow path 62 the same.

In addition, the radial dimensions of the plurality of cooling flow paths are the same according to the present embodiment. Therefore, it is easy to manufacture the plurality of cooling flow paths. In addition, it is easy to make the flow path cross-sectional area of each cooling flow path the same. As a result, it is easy to make the flow rate of the coolant the same in each cooling flow path, and it is easy to make the degree of cooling obtained by each cooling flow path more uniform.

As illustrated in FIG. 5, the connection flow path portion 63 extends in the axial direction Y. The end on the one side in the axial direction of the connection flow path portion 63 is at the same position in the axial direction Y as the end on the one side in the axial direction of the upstream cooling flow path 61. The end on the other side in the axial direction of the connection flow path portion 63 is at the same position in the axial direction Y as the end on the other side in the axial direction of the downstream cooling flow path 62.

As illustrated in FIG. 3, the radial dimension of the connection flow path portion 63 is larger than the radial dimension of the cooling flow path, that is, the radial dimension of the upstream cooling flow path 61 and the radial dimension of the downstream cooling flow path 62. Therefore, it is easy to make the flow path cross-sectional area in the connection flow path portion 63 larger than the flow path cross-sectional area of the upstream cooling flow path 61 and the flow path cross-sectional area of the downstream cooling flow path 62. As a result, when the coolant flows from the connection flow path portion 63 to the downstream cooling flow path 62, the flow rate of the coolant can be improved by reducing the flow path cross-sectional area. As a result, it is easy to increase the flow rate of the coolant in the downstream cooling flow path 62, and the cooling efficiency using the downstream cooling flow path 62 can be further improved. In addition, it is possible to reduce a pressure loss of the coolant flowing from the upstream cooling flow path 61 into the connection flow path portion 63.

As illustrated in FIG. 5, the radial dimension of the connection flow path portion 63 is smaller than the dimension of the cooling flow path in the axial direction Y, that is, the dimension of the upstream cooling flow path 61 in the axial direction Y and the dimension of the downstream cooling flow path 62 in the axial direction Y. As a result, it is possible to suppress the radial dimension of the connection flow path portion 63 from becoming too large. Therefore, it is possible to suppress the coolant flow from stagnating in the connection flow path portion 63.

The radial dimension of the connection flow path portion 63 varies depending on the position in the circumferential direction θ. The radial dimension of the connection flow path portion 63 is the largest at the center portion of the connection flow path portion 63 in the circumferential direction θ, and decreases as being separated from the center portion increases toward both sides in the circumferential direction θ. The center portion of the connection flow path portion 63 in the circumferential direction θ and the end on the other side in the circumferential direction of the connection flow path portion 63 are rounded.

As illustrated in FIG. 3, the connection flow path portion 63 is provided in the partition wall 10d. Therefore, the stator 30 and the inverter 51 can also be cooled by the coolant flowing through the connection flow path portion 63. Therefore, the stator 30 and the inverter 51 can be further cooled. In addition, when the flow path cross-sectional area of the connection flow path portion 63 is larger than the flow path cross-sectional area of the upstream cooling flow path 61 and the flow path cross-sectional area of the downstream cooling flow path 62 as in the present embodiment, the amount of the coolant flowing through the connection flow path portion 63 can be increased, and the stator 30 and the inverter 51 are more easily cooled.

In the present embodiment, the connection flow path portion 63 is provided in the portion of the partition wall 10d closer to the other side in the width direction. Here, the dimension of the partition wall 10d in the vertical direction Z increases as being separated from the central axis J in the width direction X as described above. Therefore, the portion of the partition wall 10d closer to the other side in the width direction has a larger dimension in the vertical direction Z than the center portion of the partition wall 10d in the width direction X. Therefore, even when the radial dimension of the connection flow path portion 63 is larger than the radial dimension of the cooling flow path as in the present embodiment, it is easy to provide the connection flow path portion 63 in the partition wall 10d.

In the present embodiment, the cooling unit 60 is molded by a sand mold portion having the shape of the cooling unit 60 when the housing 10 is manufactured by sand casting. As illustrated in FIGS. 1 and 2, the housing 10 has a plurality of discharge holes 19 configured to discharge the sand mold molding the cooling unit 60. After the housing 10 is manufactured by the sand casting, the sand mold molding the cooling unit 60 is discharged from the discharge hole 19. The discharge hole 19 is connected to the cooling unit 60. A plug 80 is press-fitted into the discharge hole 19. The discharge hole 19 is closed by the plug 80, and it is possible to prevent the coolant inside the cooling unit 60 from leaking outside the housing 10.

Figure 7:
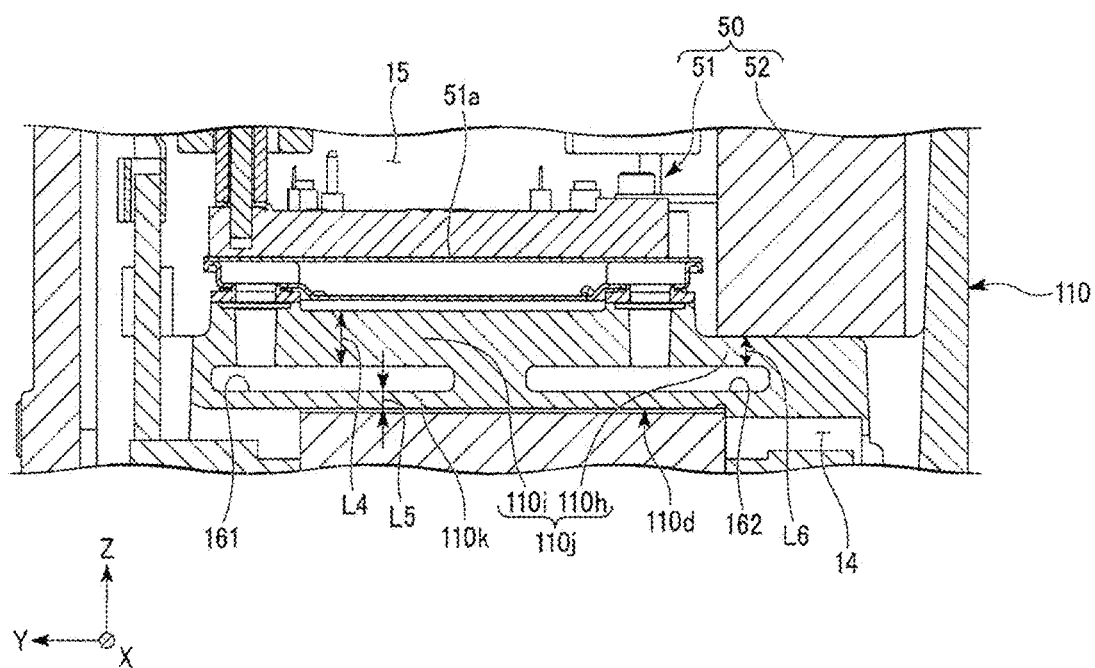
FIG. 7 is a cross-sectional view illustrating a part of a motor according to a modification of the present embodiment.

As illustrated in FIG. 7, a portion 110h located between a cooling flow path and the capacitor 52 in the radial direction has a smaller radial dimension than a portion 110i located between the cooling flow path and the inverter 51 in the radial direction in a portion 110j of a partition wall 110d located between the cooling flow path and the inverter housing portion 15 in the radial direction in a housing 110 according to the present modification. That is, a radial dimension L6 of the portion 110h is smaller than a radial dimension L4 of the portion 110i. As a result, the cooling flow path can be easily brought close to the capacitor 52, and the capacitor 52 is more easily cooled.

In the present modification, the portion 110i includes a portion of the partition wall 110d located between an upstream cooling flow path 161 and the inverter 51 in the radial direction and a portion of the partition wall 110d located between a downstream cooling flow path 162 and the inverter 51 in the radial direction. The portion 110h includes a portion of the partition wall 110d located between the downstream cooling flow path 162 and the capacitor 52 in the radial direction. In the present modification, an upper surface of the partition wall 110d with which the capacitor 52 is in contact is located below an upper surface of the partition wall 110d on which the inverter 51 is provided.

A portion 110k of the partition wall 110d located between the cooling flow path and the stator housing portion 14 in the radial direction has a smaller radial dimension than the portion 110j of the partition wall 110d located between the cooling flow path and the inverter housing portion 15. That is, a radial dimension L5 of the portion 110k is smaller than the radial dimension L4 of the portion 110i and the radial dimension L6 of the portion 110h. As a result, the cooling flow path can be brought closer to the stator housing portion 14 than the inverter housing portion 15, and the stator housing portion 14 is more easily cooled. Thus, the dimension L4, the dimension L5, and the dimension L6 satisfy the relationship $L5<L6<L4$.

The invention is not limited to the above-described embodiment, and can also employ other configurations. The cooling flow path may have an arc shape having the central angle ϕ equal to or smaller than 180°. The number of cooling flow paths is not particularly limited as long as the downstream cooling flow path as the first cooling flow path is provided. The upstream cooling flow path as the second cooling flow path is not necessarily provided. Only the downstream cooling flow path as the first cooling flow path may be provided as the cooling flow path. The radial dimensions of the plurality of cooling flow paths may be different from each other. The dimensions of the plurality of cooling flow paths in the axial direction Y may be different from each other. The shapes of the plurality of cooling flow paths may be different from each other. The portion of the cooling flow path provided in the partition wall does not necessarily overlap the inverter or does not necessarily overlap the capacitor as viewed along the vertical direction Z.

The connection flow path portion is not particularly limited as long as the cooling flow paths adjacent in the axial direction Y are connected to each other. The radial dimension of the connection flow path portion may be the same as the radial dimension of the cooling flow path, or may be smaller than the radial dimension of the cooling flow path. The connection flow path portion may connect intermediate portions of the cooling flow paths in the circumferential direction θ. The connection flow path portion may be provided in a portion other than the partition wall in the circumferential wall. A plurality of connection flow path portions may be provided. In addition, the connection flow path portion is not necessarily provided.

An application of the motor according to the embodiment described above is not particularly limited. The motor of the embodiment described above is mounted on a vehicle, for example. In addition, the above-described respective configurations can be properly combined within a range in which no conflict occurs.

The present application claims the priority of Japanese Patent Application No. 2017-147109 filed on Jul. 28, 2017, the entire contents of which are hereby incorporated by reference.

The invention claimed is:

1. A motor, comprising:
a rotor having a motor shaft arranged along a central axis that extends in one direction;
a stator opposing the rotor with a gap in a radial direction;
an inverter electrically connected to the stator;
a capacitor electrically connected to the inverter; and
a housing having a stator housing portion that houses the stator and an inverter housing portion that houses the inverter and the capacitor,
wherein the inverter housing portion is located on a radially outer side of the stator housing portion and is located on one side of the stator housing portion in a predetermined direction orthogonal to an axial direction,
the housing has a tubular circumferential wall surrounding the rotor and the stator on a radially outer side of the rotor and the stator and is a single member,
the tubular circumferential wall has:
a first cooling flow path; and
a partition wall that partitions the stator housing portion and the inverter housing portion,
the first cooling flow path extends in a circumferential direction, and at least a part of the first cooling flow path is provided in the partition wall,
a portion of the first cooling flow path provided in the partition wall has a portion overlapping the inverter and a portion overlapping the capacitor as viewed along the predetermined direction, and
in a portion of the partition wall located between the first cooling flow path and the inverter housing portion, a portion located between the first cooling flow path and the inverter in the radial direction has a smaller radial dimension than a portion located between the first cooling flow path and the capacitor in the radial direction.

2. The motor according to claim 1, wherein
a portion of the partition wall located between the first cooling flow path and the inverter housing portion in the radial direction has a smaller radial dimension than a portion of the partition wall located between the first cooling flow path and the stator housing portion.

3. The motor according to claim 2, wherein
a portion of the first cooling flow path provided in the partition wall is a single-layer flow path between the stator housing portion and the inverter in the radial direction, and is a single-layer flow path between the stator housing portion and the capacitor in the radial direction.

4. The motor according to claim 2, wherein
the tubular circumferential wall has:
a second cooling flow path located on one side in the axial direction of the first cooling flow path; and
a connection flow path portion connecting the first cooling flow path and the second cooling flow path,
the second cooling flow path has an inlet into which a coolant flows, and extends in the circumferential direction,
at least a part of the second cooling flow path is provided in the partition wall,
the first cooling flow path has an outlet through which the coolant flows out,
the capacitor is arranged on another side in the axial direction of the inverter, and
a portion of the second cooling flow path provided in the partition wall has a portion overlapping the inverter as viewed along the predetermined direction.

5. The motor according to claim 1, wherein
a portion of the first cooling flow path provided in the partition wall is a single-layer flow path between the stator housing portion and the inverter in the radial direction, and is a single-layer flow path between the stator housing portion and the capacitor in the radial direction.

6. The motor according to claim 1, wherein
the tubular circumferential wall has a second cooling flow path located on one side in the axial direction of the first cooling flow path,
the second cooling flow path has an inlet into which a coolant flows, and
the first cooling flow path has an outlet through which the coolant flows out.

7. The motor according to claim 6, wherein
an axial dimension of the first cooling flow path and an axial dimension of the second cooling flow path are equal to each other.

8. The motor according to claim 6, wherein
each of the first and second cooling flow paths has a cylindrical shape extending around the motor shaft.

9. The motor according to claim 1, wherein
the tubular circumferential wall has:

a second cooling flow path located on one side in the axial direction of the first cooling flow path; and
a connection flow path portion connecting the first cooling flow path and the second cooling flow path,
the second cooling flow path has an inlet into which a coolant flows, and extends in the circumferential direction,
at least a part of the second cooling flow path is provided in the partition wall,
the first cooling flow path has an outlet through which the coolant flows out,
the capacitor is arranged on another side in the axial direction of the inverter, and
a portion of the second cooling flow path provided in the partition wall has a portion overlapping the inverter as viewed along the predetermined direction.

10. The motor according to claim 1, wherein
the capacitor is in contact with the partition wall.

11. A motor, comprising:
a rotor having a motor shaft arranged along a central axis that extends in one direction;
a stator opposing the rotor with a gap in a radial direction;
an inverter electrically connected to the stator;
a capacitor electrically connected to the inverter; and
a housing having a stator housing portion that houses the stator and an inverter housing portion that houses the inverter and the capacitor,
wherein the inverter housing portion is located on a radially outer side of the stator housing portion and is located on one side of the stator housing portion in a predetermined direction orthogonal to an axial direction,
the housing has a tubular circumferential wall surrounding the rotor and the stator on a radially outer side of the rotor and the stator and is a single member,
the tubular circumferential wall has:
a first cooling flow path; and
a partition wall that partitions the stator housing portion and the inverter housing portion,
the first cooling flow path extends in a circumferential direction, and at least a part of the first cooling flow path is provided in the partition wall,
a portion of the first cooling flow path provided in the partition wall has a portion overlapping the inverter and a portion overlapping the capacitor as viewed along the predetermined direction, and
a portion of the partition wall located between the first cooling flow path and the inverter housing portion in the radial direction has a smaller radial dimension than a portion of the partition wall located between the first cooling flow path and the stator housing portion.

12. The motor according to claim 11, wherein
a portion of the first cooling flow path provided in the partition wall is a single-layer flow path between the stator housing portion and the inverter in the radial direction, and is a single-layer flow path between the stator housing portion and the capacitor in the radial direction.

13. The motor according to claim 11, wherein
the tubular circumferential wall has:
a second cooling flow path located on one side in the axial direction of the first cooling flow path; and
a connection flow path portion connecting the first cooling flow path and the second cooling flow path,
the second cooling flow path has an inlet into which a coolant flows, and extends in the circumferential direction,
at least a part of the second cooling flow path is provided in the partition wall,
the first cooling flow path has an outlet through which the coolant flows out,
the capacitor is arranged on another side in the axial direction of the inverter, and
a portion of the second cooling flow path provided in the partition wall has a portion overlapping the inverter as viewed along the predetermined direction.

* * * * *